US006986069B2

(12) United States Patent
Oehler et al.

(10) Patent No.: US 6,986,069 B2
(45) Date of Patent: Jan. 10, 2006

(54) METHODS AND APPARATUS FOR STATIC AND DYNAMIC POWER MANAGEMENT OF COMPUTER SYSTEMS

(75) Inventors: Richard R. Oehler, Somers, NY (US); Carl Zeitler, Jr., Austin, TX (US); Richard O. Simpson, Austin, TX (US)

(73) Assignee: Newisys, Inc., Austin, TX (US)

( * ) Notice: Subject to any disclaimer, the term of this patent is extended or adjusted under 35 U.S.C. 154(b) by 536 days.

(21) Appl. No.: 10/188,271

(22) Filed: Jul. 1, 2002

(65) Prior Publication Data

US 2004/0003303 A1    Jan. 1, 2004

(51) Int. Cl.
G06F 1/32    (2006.01)
G06F 1/28    (2006.01)
G06F 1/26    (2006.01)

(52) U.S. Cl. .................. 713/320; 713/340; 713/300
(58) Field of Classification Search ............... 713/300, 713/320, 322, 340
See application file for complete search history.

(56) References Cited

U.S. PATENT DOCUMENTS

| 5,894,579 | A | * | 4/1999 | Fujihara ................. 713/324 |
|---|---|---|---|---|
| 6,167,492 | A | | 12/2000 | Keller et al. ............... 711/154 |
| 6,385,705 | B1 | | 5/2002 | Keller et al. ............... 711/154 |
| 6,442,699 | B1 | * | 8/2002 | Nakajima .................. 713/320 |
| 6,477,388 | B1 | * | 11/2002 | Schmutz ................... 455/522 |
| 6,490,661 | B1 | | 12/2002 | Keller et al. ............... 711/150 |
| 6,493,827 | B1 | * | 12/2002 | Mueller et al. ............ 713/300 |
| 6,810,481 | B1 | * | 10/2004 | Kawade et al. ............ 713/300 |
| 2003/0005339 | A1 | * | 1/2003 | Cohen et al. ............. 713/300 |

OTHER PUBLICATIONS

*HyperTransport* ™ *I/O Link Specification Revision 1.03.* HyperTransport ™ Consortium, Oct. 10, 2001, Copyright © 2001 HyperTransport Technology Consortium.

* cited by examiner

*Primary Examiner*—Thomas Lee
*Assistant Examiner*—Ji H. Bae
(74) *Attorney, Agent, or Firm*—Beyer Weaver & Thomas, LLP

(57) ABSTRACT

According to the present invention, methods and apparatus are provided for static and dynamic power management of computer systems. A power authority manages power usage levels in computer systems by monitoring power consumption levels and providing power consumption information to the various systems. In one example, the power authority updates power tables to vary aggregate power consumption levels.

40 Claims, 8 Drawing Sheets

METHODS AND APPARATUS FOR STATIC AND DYNAMIC POWER MANAGEMENT OF COMPUTER SYSTEMS

BACKGROUND OF THE INVENTION

1. Field of the Invention

The present invention generally relates to power management. More specifically, the present invention provides techniques for statically and dynamically allocating power across multiple systems to manage individual power demands and meet multiple system power objectives.

2. Description of Related Art

Limited power management mechanisms are currently available for computer systems. Conventional mobile computing systems include power management utilities for setting computer systems into various states of operation based on present usage levels. In one example, a mobile computing system may be set into a standby state when the mobile computing system falls into a relatively inactive state of operation. The standby state can allow increased battery life. However, the different states of operation can be crude and may not reflect usage patterns of a particular user. In one example, the mobile system may go into a sleep mode the instant before processing is scheduled on the unit. Power management on a mobile system is also limited by what the operating system or BIOS of the mobile system has access to.

Other computing systems have limited power management states. A user can place a system in a standby state when no work is intended. However, a manual standby state relies on manual input from a user. Some other systems have components that will automatically power down into a lower power state when the component has not been used for a period of time. Again, however, a hard drive may power down right before a user intends to access a data file and power management is limited to an individual computing system.

Consequently, it is desirable to provide techniques for improving power management across systems using both static and dynamic mechanisms for managing power consumption levels.

SUMMARY OF THE INVENTION

According to the present invention, methods and apparatus are provided for static and dynamic power management of computer systems. A power authority manages power usage levels in computer systems by monitoring power consumption levels and providing power consumption information to the various systems. In one example, the power authority updates power tables to vary aggregate power consumption levels.

According to various embodiments, an apparatus is provided. The apparatus includes a plurality of computer systems, a power source, and a power authority. Each computer system includes a memory coupled to a processor. Each computer system has a power consumption level, wherein an aggregate power consumption level comprises a combination of the power consumption levels associated with the plurality of computer systems. A power source provides power to the plurality of computer systems. A power authority subsystem manipulates the aggregate power consumption levels by managing the power consumption levels of the plurality of computer systems.

According to other embodiments, a method for managing power consumption across multiple systems is provided. The method includes identifying a maximum power output associated with a power supply configured to provide power to a first computer system and a second computer system, receiving power requirements information associated with the first and second computer systems, generating power consumption information using the power requirements information, and providing power consumption information to the first and second computer systems, wherein power consumption information directs the first and second computer systems to run with an aggregate power consumption less than the maximum power output.

Another aspect of the invention pertains to computer program products including a machine readable medium on which is stored program instructions, tables or lists, and/or data structures for implementing a method as described above. Any of the methods, tables, or data structures of this invention may be represented as program instructions that can be provided on such computer readable media.

A further understanding of the nature and advantages of the present invention may be realized by reference to the remaining portions of the specification and the drawings.

BRIEF DESCRIPTION OF THE DRAWINGS

The invention may best be understood by reference to the following description taken in conjunction with the accompanying drawings, which are illustrative of specific embodiments of the present invention.

DETAILED DESCRIPTION OF SPECIFIC EMBODIMENTS

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. Any single or multiple system architecture using a power source can use the techniques of the present invention. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
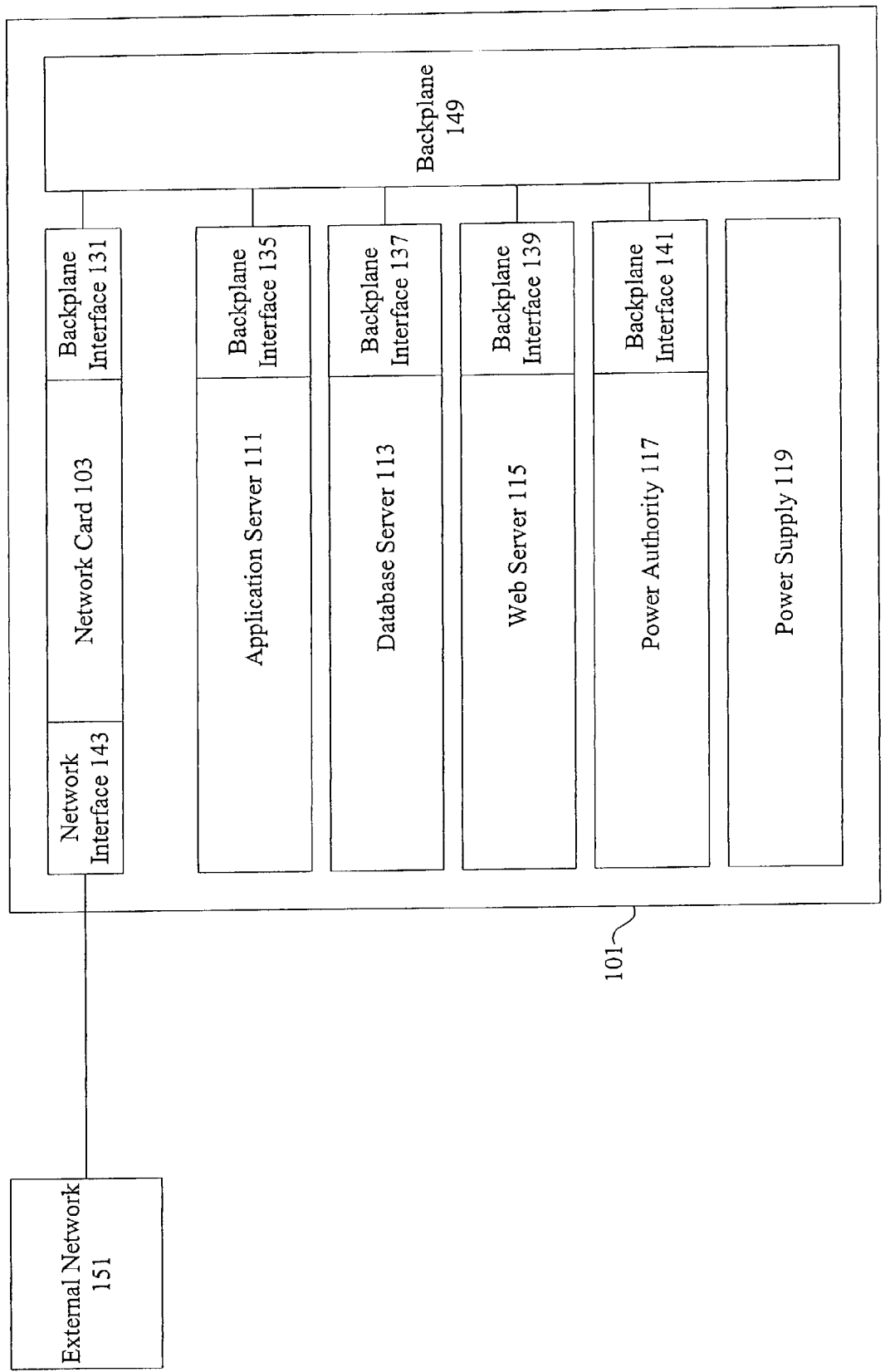
FIG. 1 is a diagrammatic representation of a system that can use the techniques of the present invention.

FIG. 1 is a diagrammatic representation of a system that can use the techniques of the present invention. According to various embodiments, the system is configured on a rack 101. It should be noted, however, that the techniques of the present invention can be applied to a configuration having multiple racks. The rack 101 can contain various computer systems such as application server 111, database server 113, and web server 115. Each computer system can include multiple processors and multiple storage components. In one example, each computer system has its own address space. Each computer system is connected to a backplane 149 through backplane interfaces 135, 137, and 139. The backplane interface allows application server 111, database server 1 13, and web server 115 to communicate with each other as well as to communicate with an external network 151 through network card 103. Network card 103 similarly has a backplane interface 131 and a network interface 143.

It should be noted that each of the computer systems 111, 113, and 115 may be connected in a variety of different manners. In one example, backplane 149 can be a SCSI or Ethernet medium. In another example, each computer system may have direct point-to-point links with other computer systems. Each computer system may also have its own network card or interface with external networks. In one implementation, the techniques of the present invention can be implemented on separate computer systems that are not configured on a rack or chassis. It should be noted that the separate computer systems can be connected through conventional network media such as Ethernet, token ring, or wireless interfaces, although the separate computer systems may share a power source. Any mechanism for providing power to a computer system is referred to herein as a power source. A power source may include one or more power supplies. Alternatively, a power source may be a power distribution mechanism providing power from a utility or generator to various power supplies on a rack.

According to various embodiments, power supplies are provided in each system on a rack. Each system 111, 113, and 115 has one or more individual power supplies. External power such as that provided from a utility or generator is supplied to the rack through a mechanism such as a power distribution mechanism. In another implementation, the various computer systems configured on a rack 101 share power from a power supply 119. The power supply 119 is configured to provide power to the various computer systems in rack 101 and is typically selected as a power supply based on its capacity to supply power to all computer systems 111, 113, and 115. Capacity to supply power to all computer systems may be based on worst-case expected power requirements. In one example, the worst-case expected power requirement is the level of power drawn if all computer systems are operating at full power usage. In one example, the processor may be operating at the highest possible clock speed, the hard drive may be spinning constantly, component sound cards, video cards, network cards may all be in active mode. The power supply may be configured to provide a maximum power output of 2000 watts and each of the three computer systems may have a maximum power consumption level of 650 watts for an aggregate power consumption level of 1950 watts.

In typical implementations, if an additional processor or hard-drive is added to each of the three computer systems, maximum power consumption levels can increase and render the existing power supply potentially inadequate. When a power supply is even potentially inadequate or has proven inadequate of the past, additional power supplies are typically added. However, simply adding power supplies can result in several drawbacks. Even temporarily insufficient power can disrupt optimal system operation and lead to processing re-initialization. Furthermore, extra power supplies are added even when they may not be necessary. In one example, the various computer systems may not be accessing hard disks frequently, and the average total power consumption level of the three computer systems may be closer to 800 watts. A power supply with a maximum power output of 2000 watts would be more than adequate for such a system, yet in conventional implementations, more power supplies would likely be added if an additional hard disk were added to each system.

According to various embodiments, the techniques of the present invention provide a power authority 117 connected to a backplane 149 through a backplane interface 141 to manage power distribution to various computer systems 111, 113, and 115. The power authority 117 recognizes the amount of power available from power supply 119 and efficiently allocates available power to application server 111, database server 113, and web server 115. According to various embodiments, the power management by the power authority 117 can be static or dynamic. More specifically, the allocation can be done through user intervention initially or allocation can be done automatically with intelligent analysis of past or anticipated usage patterns. For example, the power authority can allocate more power to a business application server during business hours and more power to an entertainment web server during evening hours. If another computer system is added to the rack 101, power authority 117 can reallocate power distribution to the various computer systems.

In typical implementations, application server 111, database server 113, and web server 115 each may perform their own power management functions. The power authority can analyze usage patterns associated with the application server 111, database server 113, and web server 115 and form a more complete power management scheme using power usage information not only from the components within a single system but power usage information across different systems. The power authority benefits from being able to see overall power consumption levels. An individual application server 111 may recognize that its own power consumption levels are high and decrease its power consumption accordingly. However, an application server 111 can not typically recognize that the power consumption levels of a database server 113 are low, and consequently the power supply serving both the application server 111 and the database server 113 can manage the increased power consumption levels on the application server 111. According to various embodiments, a service processor or multiple service processors together can be a power authority.

A power authority associated with the system can recognize overall usage patterns. The power authority has more information enabling it to determine intelligently what power allocation levels to set for each system. It should be noted that a power authority can be a separate computer system, a resource on a particular computer system, or it can be integrated in one of the power managed systems.

Figure 2:
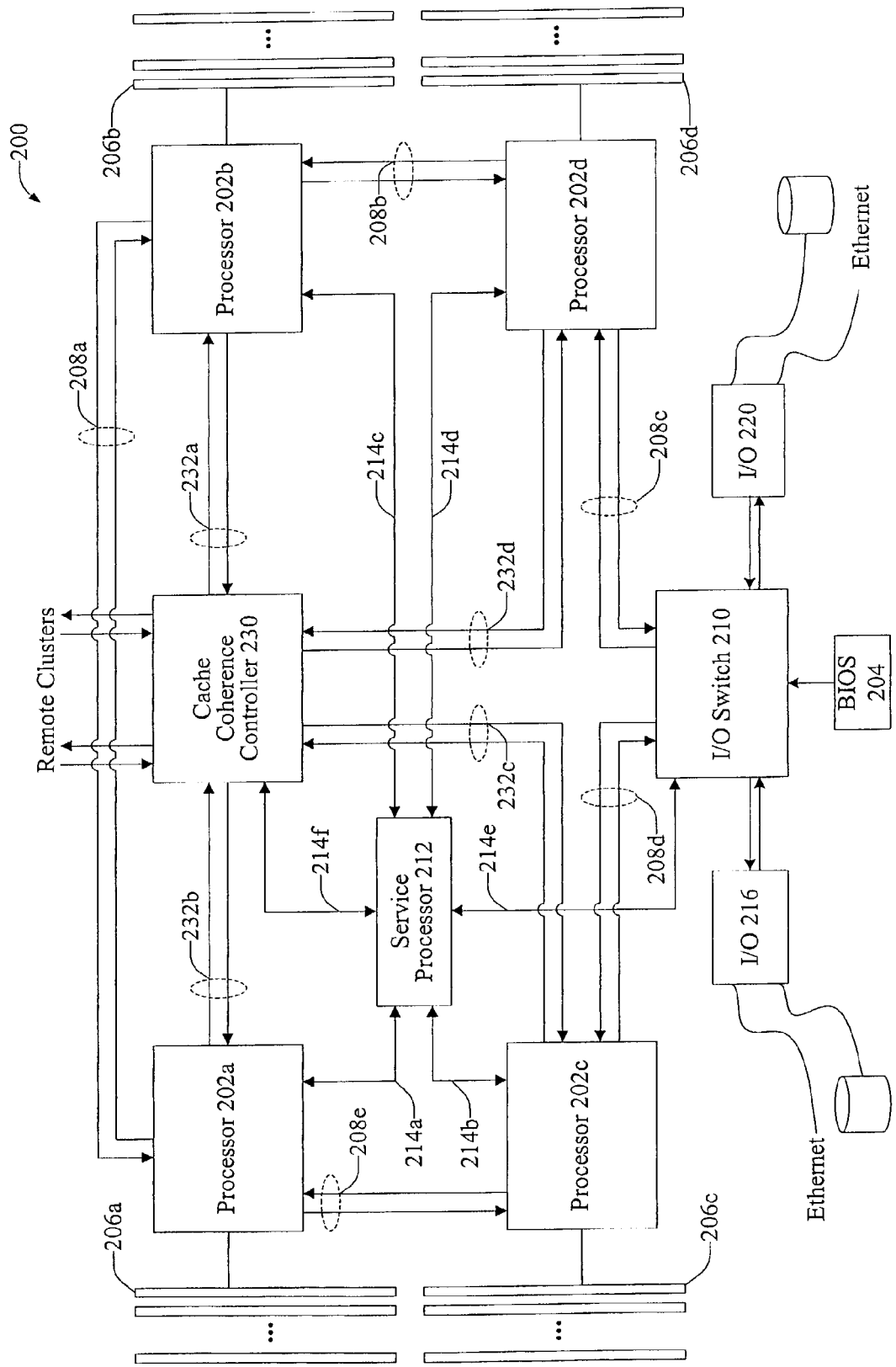
FIG. 2 is a diagrammatic representation showing more detail of a specific computer system.

FIG. 2 is a diagrammatic representation of one example of a computer system. Although one particular computer system will be described in detail, it should be noted that a variety of different computer system configurations may be employed to implement the techniques of the present invention. In one example, a computer system may include a single processor and no permanent storage. In another example, the computer system may include multiple processors, cache coherence controllers, service processors, multiple arrays of disks, and various network interfaces. Any number of computer systems can use the techniques of the present invention.

One example of such a computer system is the computer system 200 shown in FIG. 2. Computer system 200 includes processors 202a–202d, a Basic I/O system (BIOS) 204, a memory subsystem comprising memory banks 206a–206d, point-to-point communication links 208a–208e for interconnecting processors 202a–202d and I/O switch 210, a cache coherence controller 230, a service processor 212 which communicates with processors 202a–202d, a cache coherence controller 230, and an I/O switch 210 via a JTAG interface represented in FIG. 2 by links 214a–214f. I/O switch 210 connects the rest of the system to I/O adapters 216 and 220.

According to various embodiments, the service processor of the present invention has the intelligence to manipulate power tables associated with a particular computer system. Any structure or mechanism for maintaining power management information is referred to herein as a power table. According to one embodiment, the service processor can also allow a power authority to manage power directly instead of managing power through an operating system.

The service processor of the present invention can also have the intelligence to partition system resources according to a previously specified partitioning schema. The partitioning can be achieved through direct manipulation of routing tables associated with the system processors by the service processor which is made possible by the point-to-point communication infrastructure. The routing tables are used to control and isolate various system resources, the connections between which are defined therein. The service processor and computer system partitioning are described in patent application Ser. No. 09/932,456 titled Computer System Partitioning Using Data Transfer Routing Mechanism, filed on Aug. 16, 2001, the entirety of which is incorporated by reference for all purposes.

The processors 202a–d are coupled to a cache coherence controller 230 through point-to-point links 232a–d. Any logic or apparatus that can be used to provide communication between multiple processor clusters while maintaining cache coherence is referred to herein as a cache coherence controller. The cache coherence controller 230 can be coupled to cache coherence controllers associated with other multiprocessor clusters. It should be noted that there can be more than one cache coherence controller in one cluster. The cache coherence controller 230 can communicate with both processors 202a–d as well as remote clusters using a point-to-point protocol.

As noted above, the specific architecture shown in FIG. 2 is merely exemplary and the embodiments of the present invention are contemplated having different configurations and resource interconnections. A variety of alternatives for each of the system resources shown are possible. According to various embodiments, the techniques of the present invention can be used in any computer system that supports the ability to set power levels. Although particular embodiments described herein may include partitioning and a cache coherence controller, it should be noted that in many implementations, neither partitioning nor a cache coherence controller may be used.

Figure 3:
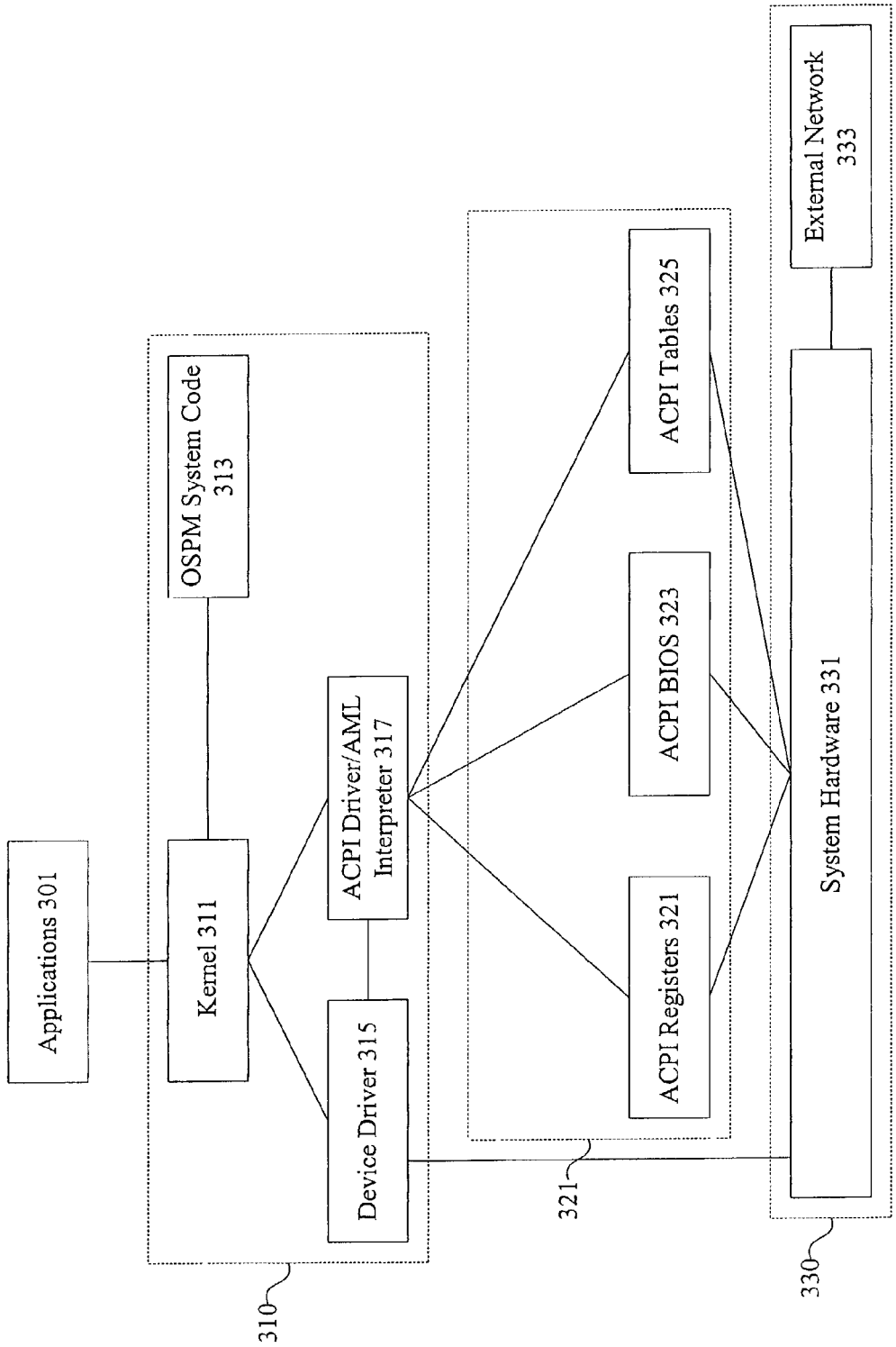
FIG. 3 is a diagrammatic representation depicting power related components that can be implemented on a computer system.

FIG. 3 is a diagrammatic representation of one example of a power management scheme within a computer system. A variety of different power management schemes can be implemented using the techniques of the present invention. One type of power management scheme such as the Advanced Power Management (APM) scheme, is implemented primarily using BIOS instructions. BIOS instructions, typically written in read-only memory, monitor various computer system devices and initiate shutdown and sleep modes for the various computer system devices. The BIOS instructions also control when a hardware component should be returned to a working state.

Another type of power management scheme transfers the power management responsibility from the BIOS to the operating system. Operating system power management schemes, such as the Advanced Configuration and Power Interface (ACPI), provide that the operating system itself can control all system and component power states. An ACPI system can include a portion 330 having system hardware 331 and external network 333. An operating system portion 310 can include a kernel 311 and operating system power management system code 313. A variety of different applications 301 can run on top of the operating system 310. The operating system power management system code 313 can tell the operating system when various components should be in particular power states. The operating system portion 310 can also include device drivers 315 for controlling system hardware 331 as well as an ACPI driver 317 which allows the operating system to interact with ACPI power management mechanisms.

The ACPI driver can be an operating system program that controls transitions between various power states, such as active, sleep, and off. The ACPI power management portion 320 can include registers 321, tables 325, and BIOS 323. More information about ACPI can be found in the Advanced Configuration and Power Interface Specification version 1.0b and version 2.0, the entirety of which is incorporated by reference for all purposes. ACPI registers 321 can store and pass information between the ACPI driver 317 and the system hardware 331. The ACPI tables are used to maintain power management information such as power supplies, power states, clock sources, features available on various hardware components, and techniques for managing those features. Any structure or mechanism for providing power management information is referred to herein as a power table. In one example, a power table is an ACPI power table.

According to various embodiments, the power authority is an application running on an operating system. The application receives workload messages from all operating systems over which it has authority. The application can manage mechanisms such as the various service processors and the underlying ACPI functionality.

Figure 4:
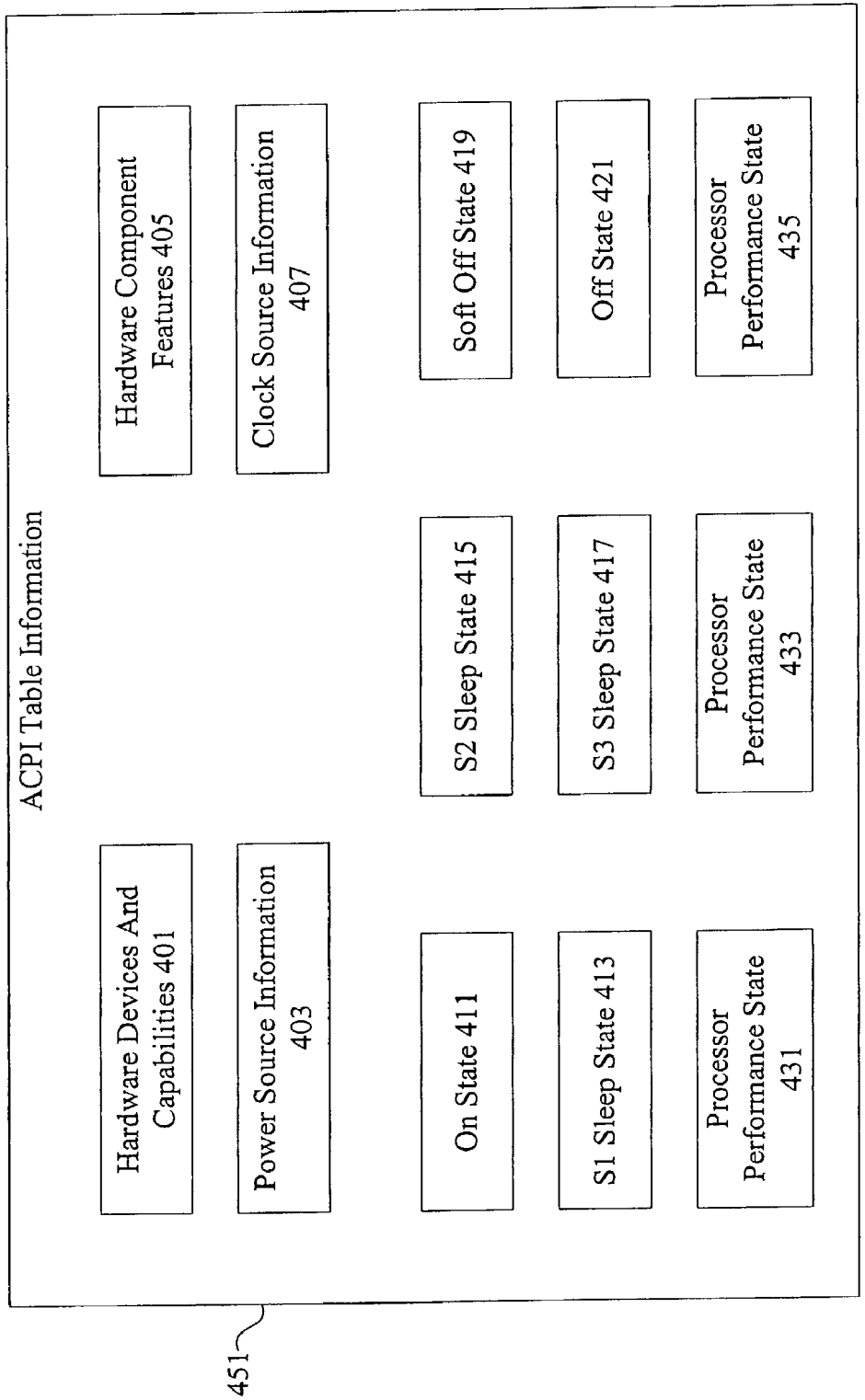
FIG. 4 is a diagrammatic representation of a power table.

FIG. 4 is a diagrammatic representation of one example of a power table. Although an ACPI table is shown with specific state and power management information, it should be noted that a variety of different possible structures can be used to provide power management related information. In one example, only the three states of active, sleep, and off are stored along with information indicating when to transition between the three states. Only power management along a system level may be provided in one example, and all components transition between the active, sleep, and off states at the same time. In other embodiments, all hardware devices have different capabilities. Some devices may have various other states including active, different levels of sleep, soft off, and true off states.

It should be noted that the power tables among the different systems may also vary. Some systems may have components that support a number of sleep states while other systems may support only system level power management. A power authority can recognize differences between power tables amongst the various systems and adjust power tables based on capabilities and hardware support.

According to various embodiments, the ACPI table 451 include codes identifying various states. In ACPI, six system level states are defined: the on state 41, three different sleep states 413, 415, 417, a soft off state 419, and an off state 421. ACPI also defines and allows for a variable number of processor performance states, 431, 433, and 435 that control the voltage and frequency of individual processors. The ACPI table can additionally include information about various hardware devices and the capabilities of the hardware devices 401. In one example, a hard disk may only have three possible states, while a system has six possible states. The ACPI table 451 can also include information about the power source 403 and information about the clock sources 407. Hardware component features 405 can also include mechanisms for controlling various hardware components.

According to various embodiments of the present invention, the power authority external to the particular computer system modifies power management information by changing power table values. In one example, the power authority alters power table values so that a particular computer system enters sleep mode more readily. In another example, the power authority can change table values so that less power is allocated to a particular set of CPUs during certain time periods.

Figure 5:
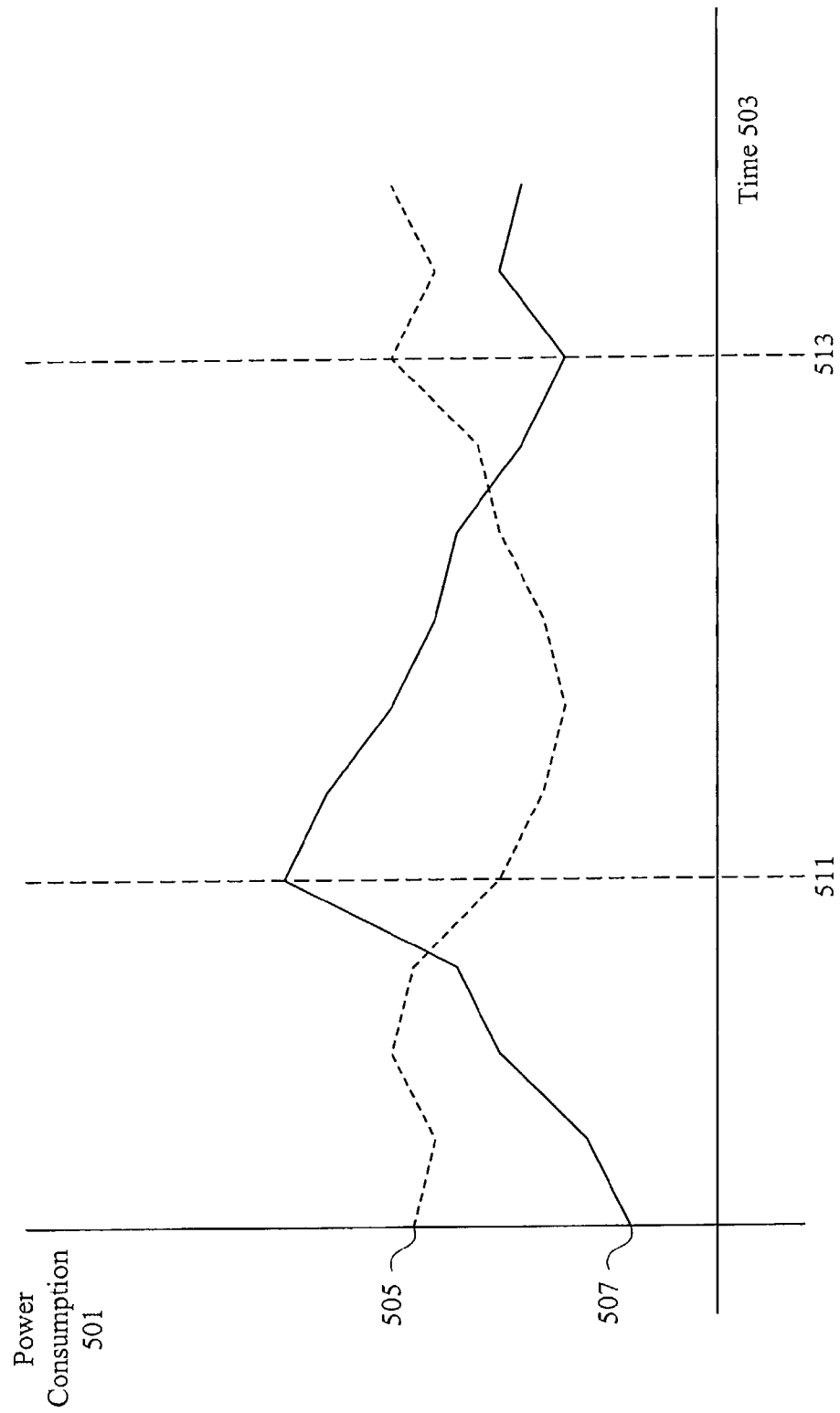
FIG. 5 is a graphical representation of actual power consumption levels for various components.

FIG. 5 is a graphical representation of actual power consumption levels for various systems. According to various embodiments, the web server 505 consumes different amounts of power at different times 511 and 513. Here, the web server 505 consumes more power at time 513. Using historical information such as past power consumption information, a power authority can determine when and how much power to allocate to various systems. Any information that can be acquired or provided to a computer system to alter power usage is referred to herein as power consumption information. In one example, power consumption information can include codes for setting a device in the standby state. In another example, power consumption information can include times at which a system processor should decrease its processing clock speed and voltage.

According to various embodiments, if an application server 507 typically consumes less power at time 513 than at time 511, less power can be allocated daily to application server 507 at time 513 even if the application server 507 is busy at that particular moment. Less power can be allocated by the power authority because the power authority can override the power management capabilities of the application server 507. The power authority can preemptively allocate less power to the application server at time 513 and more power to the web server 505 at time 513.

Power consumption levels can be reported at various times to a power authority by an operating system associated with the web server application server. According to various embodiments, the operating system can maintain a large amount of historical power consumption information and provide information in its entirety to the power authority. According to other embodiments, an operating system can provide power consumption information to a power authority during varying fixed intervals time. The power authority can then compile the information to create a historical power consumption representation. In still other embodiments, a service processor associated with a particular system can report power consumption levels information to a power authority. A service processor can monitor or simply forward power consumption levels from an operating system to the power authority.

By using a power consumption level history, a power authority can dynamically manage power consumption levels. More detail on dynamically managing power consumption across multiple systems using actual power consumption level histories will be described below. Static power management is also contemplated. According to various embodiments, power consumption level histories are not needed to implement static power management.

Figure 6:
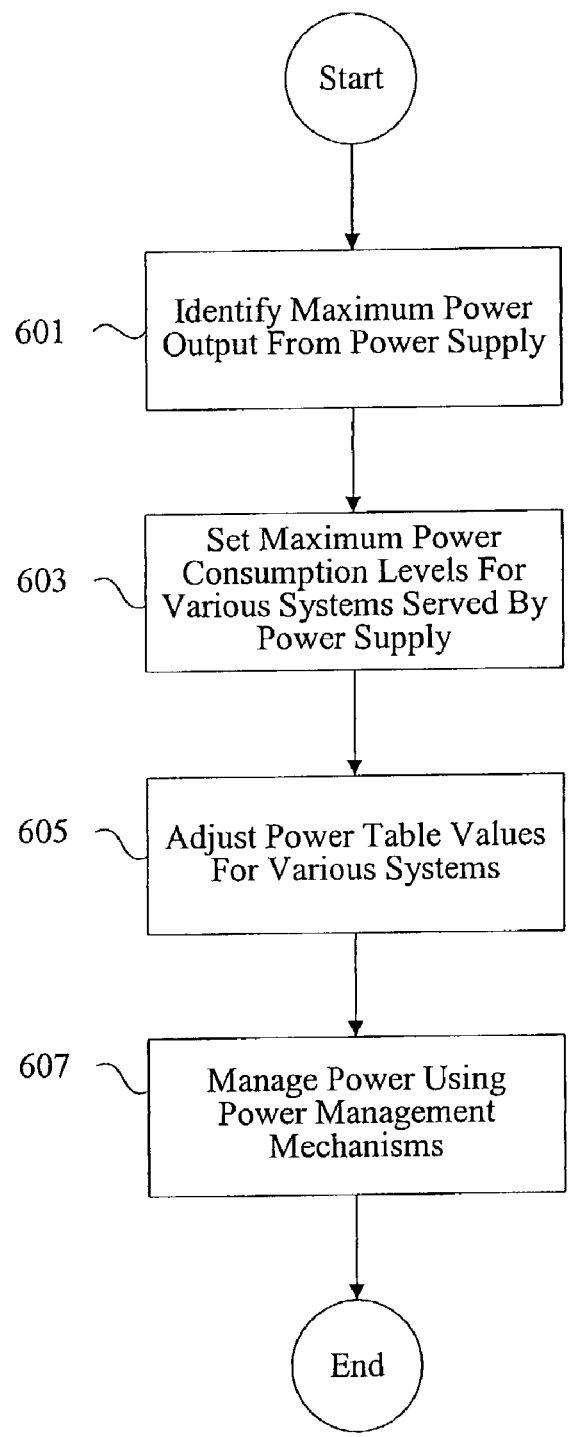
FIG. 6 is a flow process diagram showing an example of static management of power consumption across multiple systems.

FIG. 6 is a flow process diagram showing static power management, according to a specific embodiment of the present invention. At 601, the maximum power output from a power supply or a group of power supplies is determined. The maximum power supply output provides information for the power authority to determine maximum possible load. At 603, entities such as a power authority can set maximum power consumption levels for various systems served by the power supply. In one example, the power authority can allocate 300 watts to an application server, 600 watts to a database server, and 600 watts to a web server. The maximum power consumption levels may be configured by a user providing power requirements information of the various systems. Information about how much power each of the various systems may need is referred to herein as power requirements information. At 605, power table values such as ACPI values are adjusted in various systems so that the web server, application server, and database server each will use less than the allotted amount of power. According to other embodiments, power table values such as ACPI values are adjusted so that average power consumption levels for each of different systems can be managed by the power supply. At 607, power can then be managed by each of the individual operating systems using existing power management mechanisms such as ACPI.

It should be noted that static management can occur at various times. In one embodiment, power requirements information can be entered before a reboot sequence to allow the power authority to access the information and update power table values before a computer system is restarted. However, it is also contemplated that the power authority can receive power requirements information after reboot to allow update of power table values after a system has been restarted.

Figure 7:
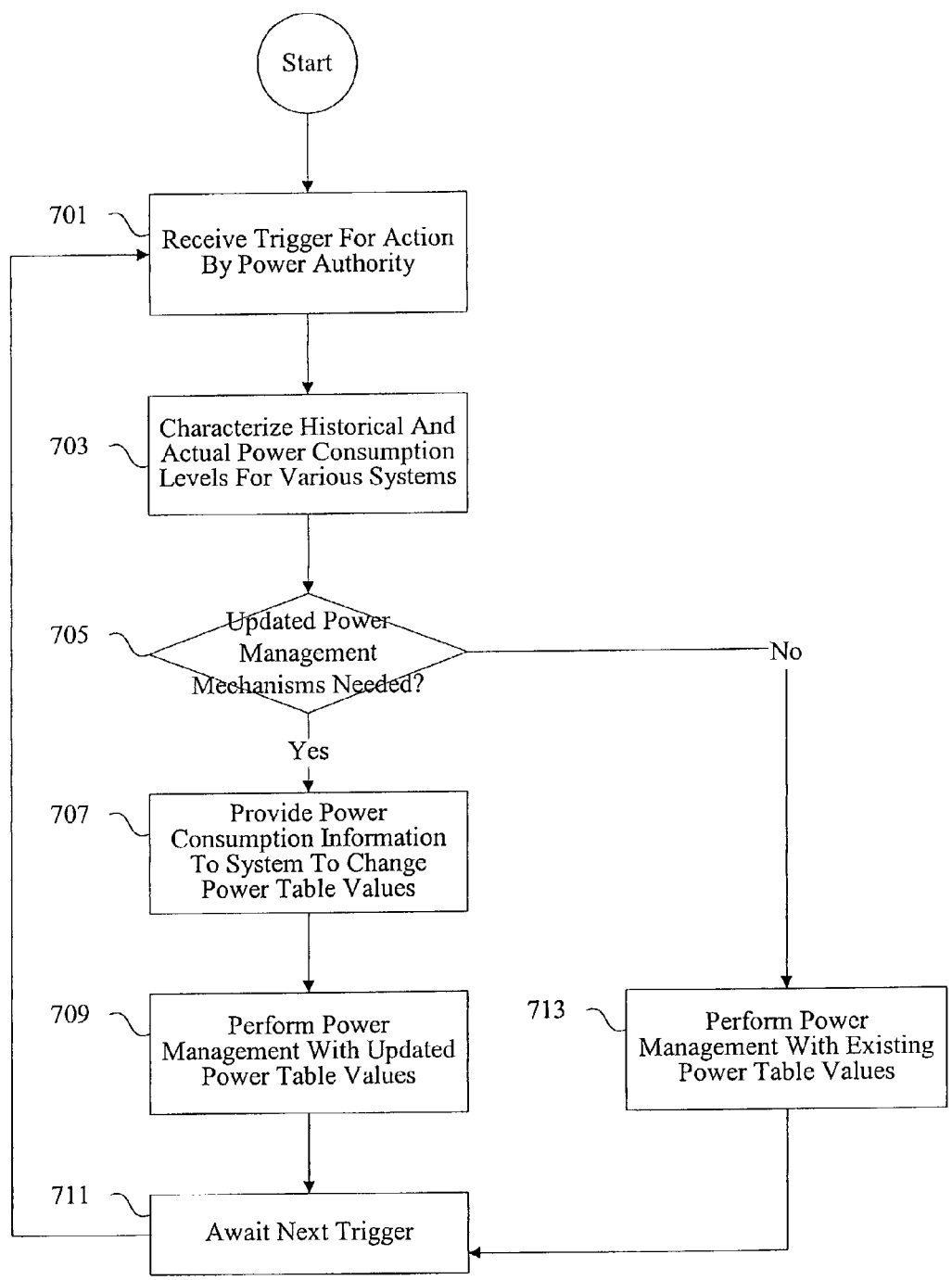
FIG. 7 is a flow process diagram showing an example of dynamic management of power consumption across multiple systems using an actual power consumption level history.

FIG. 7 is a flow process diagram showing dynamic power management according to a specific embodiment of the present invention. At 701, the power authority receives a trigger for action. In one example, the trigger can be a timer or some indication that aggregate or total power consumption levels by the various systems is approaching a percentage of total power supply output. In another example, a trigger can arise after periodically receiving power consumption information. At 703, the power authority characterizes historical actual power consumption levels for the various systems served by the power supply. It should be noted that characterizing historical actual power consumption levels may mean gathering numerical values sent by an operating system or a service processor and identifying patterns of usage. Characterizing historical actual power consumption levels may also mean interpreting a graphical representation provided by service processor.

Various techniques for characterizing historical actual power consumption levels are contemplated. At 705, it can be determined whether updated power management mechanisms are needed. In one example, if it is determined that a web server has been allocated 600 watts but has never used more than 300 watts, some of the power can be reallocated to a different client/server system. In another example, it may be determined that all systems should reduce power consumption levels by 20 percent if the aggregate power consumption levels of all the different systems has reached total power supply output frequently in the past. At 707, if updated power management mechanisms are needed, power consumption information is provided to various systems in order to change power table values or ACPI table values. Power management can then be performed at 709 with updated power table values. If no updated power management mechanisms are needed, power management with existing power table values is performed at 713 and a next trigger is awaited at 711.

It should be noted that changing power tables or ACPI tables is merely one of a variety of mechanisms for managing power consumption levels within a system. According to other embodiments, it is contemplated that the power authority can shut down individual components such as a hard disk when it is determined that new power management mechanisms are needed. In another example, rules governing power management within an operating system can be altered in addition to altering power table values.

Figure 8:
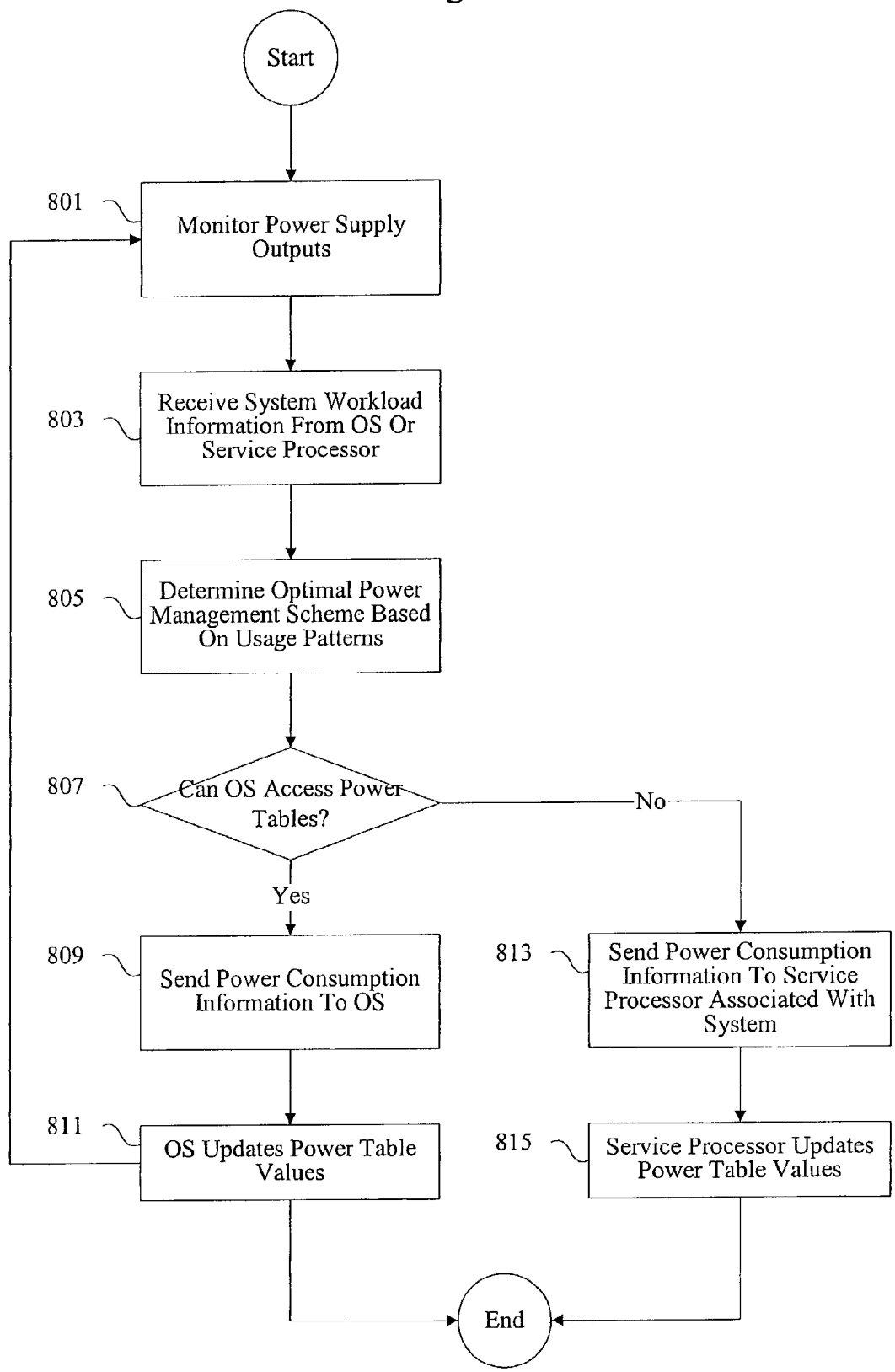
FIG. 8 is a flow process diagram showing the generation of power consumption information.

FIG. 8 is a diagrammatic representation showing the generation of power consumption information. As noted above, power consumption information can be obtained from a variety of different sources. In one example, a power authority can monitor power supply output to the various systems on a rack 801. In another example, a service processor or an operating system can provide power consumption information to the power authority at 803. At 805, the power authority can determine optimal power management schemes based on usage patterns or historical power consumption level information. The power authority can then determine whether they can access power tables through an operating system 807. If the power authority can access power tables through the operating system, power consumption information is sent to the operating system 809. The operating system can then update power table values at 811. If the power authority cannot access power tables at 807, power consumption information is sent at 813 to a service processor associated with the system. The service processor can then update power table values at 815.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed using various mechanisms for historical power consumption analysis. In another example, multiple service processors may be associated with a cluster of processors and a power authority can send power management information to a selected service processor. In still another example, a power authority may be separate computer system distinct from the different computer systems it is managing. However, in one example, the power authority can actually be part of one of the systems that the power authority manages. Therefore, the scope of the invention should be determined with reference to the appended claims.

What is claimed is:

1. An apparatus, comprising:
    a plurality of computer systems, each computer system including a memory coupled to a processor and each computer system having a power consumption level, wherein an aggregate power consumption level comprises a combination of the power consumption levels associated with the plurality of computer systems;
    a power source providing power to the plurality of computer systems;
    a power authority subsystem for manipulating the aggregate power consumption levels by managing the power consumption levels of the plurality of computer systems, wherein managing the power consumption of the plurality of computer systems comprises providing power consumption information to a plurality of service processors, wherein each of the plurality of computer systems includes one or more service processors.

2. The apparatus of claim 1, wherein the power source has a maximum power output less than the aggregate power consumption levels.

3. The apparatus of claim 1, wherein the power authority subsystem manages power consumption levels to minimize aggregate power consumption.

4. The apparatus of claim 2, wherein the power authority is configured to manage the power consumption of the plurality of computer systems so that the aggregate power consumption of the plurality of computer systems does not exceed the maximum power output or the power source.

5. The apparatus of claim 1, wherein managing the power consumption levels of the plurality of computer systems comprises providing power consumption information to the plurality of computer systems.

6. The apparatus of claim 5, wherein managing the power consumption of the plurality of computer systems comprises writing power consumption information into the power tables associated with the plurality of computer systems.

7. The apparatus of claim 6, wherein the power tables are Advanced Configuration and Power Interface tables.

8. The apparatus of claim 6, wherein the power source is a power supply.

9. The apparatus of claim 7, wherein the plurality of computer systems have distinct address spaces.

10. The apparatus of claim 6, wherein each computer system is associated with a service processor.

11. The apparatus of claim 9, wherein managing the power consumption of the plurality of computer systems comprises providing power consumption information before reboot sequences of the plurality of computer systems are completed.

12. The apparatus of claim 6, wherein managing the power consumption of the plurality of computer systems comprises providing power consumption information after reboot sequences of the plurality of computer systems are completed.

13. The apparatus of claim 12, wherein power tables are updated dynamically during runtime using power consumption information.

14. A method for managing power consumption across multiple systems, the method comprising:
    identifying a maximum power output associated with a power supply configured to provide power to a first computer system and a second computer system;
    receiving power requirements information associated with the first and second computer systems;
    generating power consumption information using the power requirements information;
    providing power consumption information to the first and second computer systems, wherein power consumption information directs the first and second computer systems to run with an aggregate power consumption less than the maximum power output, wherein providing power consumption information comprises sending power consumption information to a first service processor associated with the first computer system and to a second service processor associated with the second computer system.

15. The method of claim 14, wherein power requirements information is received from a user.

16. The method of claim 14, wherein power requirements information is received from the first and second computer systems.

17. The method of claim 14, wherein the power supply is further configured to provide power to a third computer system.

18. The method of claim 17, further comprising receiving power requirements information associated with the third computer system.

19. The method of claim 18, wherein the power supply is further configured to provide power to the first, second, and third computer systems through a power distribution network.

20. The method of claim 16, wherein the first and second computer systems each has its own address space.

21. The method of claim 16, wherein a power authority receives power requirements information.

22. The method of claim 21, wherein power requirements information is received periodically.

23. The method of claim 22, wherein power requirements information is derived using actual power demands and actual workloads associated with the first and second computer systems.

24. The method of claim 16, wherein providing power consumption information is used to adjust power tables associated with the first and second computer systems.

25. The method of claim 24, wherein the power tables are Advanced Configuration and Power Interface tables.

26. The method of claim 16, wherein power consumption information is provided before the boot sequence of the first and second computer systems is completed.

27. The method of claim 16, wherein power consumption information is provided dynamically during runtime of the first and second computer systems.

28. The method of claim 24, wherein adjusting the power table associated with the first computer system changes the power consumption state of a first component in the first computer system.

29. A computer readable medium comprising computer code for managing power consumption across multiple systems, the computer readable medium comprising:
  computer code for identifying a maximum power output associated with a power supply configured to provide power to a first computer system and a second computer system;
  computer code for receiving power requirements information associated with the first and second computer systems;
  computer code for generating power consumption information using the power requirements information;
  computer code for providing power consumption information to the first and second computer systems, wherein power consumption information directs the first and second computer systems to run at specified aggregate power consumption levels, wherein providing power consumption information comprises sending power consumption information to a first service processor associated with the first computer system and to a second service processor associated with the second computer system.

30. The computer readable medium of claim 29, wherein power requirements information is received from a user.

31. The computer readable medium of claim 29, wherein power requirements information is received from the first and second computer systems.

32. The computer readable medium of claim 31, wherein the first and second computer systems each has its own address space.

33. The computer readable medium of claim 31, wherein a power authority receives power requirements information.

34. The computer readable medium of claim 33, wherein power requirements information is received periodically.

35. The computer readable medium of claim 34, wherein power requirements information is derived using actual power demands and actual workloads associated with the first and second computer systems.

36. The computer readable medium of claim 31, wherein providing power consumption information is used to adjust power tables associated with the first and second computer systems.

37. The computer readable medium of claim 36, wherein the power tables are Advanced Configuration and Power Interface tables.

38. The computer readable medium of claim 31, wherein power consumption information is provided before the boot sequence of the first and second computer systems is completed.

39. The computer readable medium of claim 31, wherein power consumption information is provided dynamically during runtime of the first and second computer systems.

40. The computer readable medium of claim 36, wherein adjusting the power table associated with the first computer system changes the power consumption state of a first component in the first computer system.

* * * * *